(12) United States Patent
Gonzalez et al.

(10) Patent No.: US 10,457,899 B2
(45) Date of Patent: Oct. 29, 2019

(54) POLYFUNCTIONAL POLYMERS BASED ON PHOSPHONATE UNITS AND AMINE UNITS

(71) Applicant: RHODIA OPERATIONS, Paris (FR)

(72) Inventors: Inigo Gonzalez, Paris (FR);
Marie-Pierre Labeau, Sevre (FR);
Gary Woodward, Cheshire (GB)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/519,199

(22) PCT Filed: Oct. 15, 2015

(86) PCT No.: PCT/EP2015/073911
§ 371 (c)(1),
(2) Date: Apr. 14, 2017

(87) PCT Pub. No.: WO2016/059168
PCT Pub. Date: Apr. 21, 2016

(65) Prior Publication Data
US 2017/0233685 A1     Aug. 17, 2017

(30) Foreign Application Priority Data

Oct. 17, 2014   (FR) ...................................... 14 02346

(51) Int. Cl.
| | | |
|---|---|---|
| *C08F 226/02* | (2006.01) |
| *C11D 3/37* | (2006.01) |
| *C08F 230/02* | (2006.01) |
| *C08F 8/12* | (2006.01) |
| *C08F 218/08* | (2006.01) |
| *C11D 11/00* | (2006.01) |
| *C08F 8/40* | (2006.01) |
| *C08F 220/34* | (2006.01) |

(52) U.S. Cl.
CPC .............. *C11D 3/3784* (2013.01); *C08F 8/12* (2013.01); *C08F 218/08* (2013.01); *C08F 226/02* (2013.01); *C08F 230/02* (2013.01); *C11D 11/0029* (2013.01)

(58) Field of Classification Search
CPC ................................ C11D 3/03; C11D 3/3784
USPC ......................................................... 528/399
See application file for complete search history.

(56) References Cited

U.S. PATENT DOCUMENTS

2012/0080120 A1    4/2012    Fesenbecker et al.

FOREIGN PATENT DOCUMENTS

| DE | 10 2005 056436 A1 | 5/2007 |
| WO | 200812248 A1 | 1/2008 |

OTHER PUBLICATIONS

Tbal H et al: "Functionalization and chelating properties of a porous polymer derived from vinylamine," European Polymer Journal, Pergamon Press Ltd. Oxford, GB, vol. 28, No. 6, Jun. 1, 1992 (Jun. 1, 1992), pp. 671-679, XP024053586.

*Primary Examiner* — Duc Truong

(57) ABSTRACT

The invention relates to polyfunctional polymers suitable in particular for the treatment of metal surfaces (metal finishing) and comprising: monomer units u1 bearing phosphonic acid functions; monomer units u2 bearing amine functions; and optionally monomer units u3 bearing alcohol units —OH.

18 Claims, No Drawings

POLYFUNCTIONAL POLYMERS BASED ON PHOSPHONATE UNITS AND AMINE UNITS

This application is a U.S. national phase entry under 35 U.S.C. § 371 of International Application No. PCT/EP2015/073911, filed on Oct. 15, 2015, which claims priority to French Application No. 14 02346, filed on Oct. 17, 2014, the entirety of which is being incorporated herein by reference for all purposes.

The present invention relates to polyfunctional polymers that are suitable especially for treating metallic surfaces intended to be painted, and to various routes for accessing these polymers.

In the field of treating metal surfaces, various types of compositions are known for cleaning a surface and/or for preparing the surface for subsequent treatments. "Finishing" techniques (the term "metal finishing" is more usually used) allow the metal surface to be prepared, especially to optimize the subsequent deposition of a coating (paint, varnish, etc.) on the metal surface.

By way of example, various aqueous compositions based on polymers, especially acrylic resins, have been described, for instance in U.S. Pat. No. 4,517,028.

One aim of the present invention is to provide products and formulations that are suitable especially for finishing treatment metal surfaces intended to be painted.

To this end, the present invention proposes a novel type of base polymer, which may be used, inter alia, alone or as a mixture with other additives, for the finishing treatment of metal surfaces intended to be painted, in particular for treating aluminum surfaces.

More specifically, according to a first aspect, one subject of the present invention is a polyfunctional polymer comprising (and generally consisting of):

- monomer units u1, referred to hereinbelow as "phosphonate units", bearing phosphonic acid functions —P(=O)(OH)$_2$ in their acid form or totally or partly in deprotonated form (phosphonate —PO$_3^{2-}$ or hydrogen phosphonate —P(=O)((OH)O$^-$)
- monomer units u2, referred to hereinbelow as "amine units", bearing amine functions, which are optionally totally or partly protonated, preferably including primary amines —NH$_2$ which are optionally totally or partly protonated in ammonium form —NH$_3^+$
- optionally, monomer units u3, referred to hereinbelow as "alcohol units", bearing alcohol functions —OH.

According to another aspect, a subject of the present invention is formulations that are suitable, inter alia, for the finishing treatment of metal surfaces, and especially for the finishing treatment of aluminum surfaces, comprising at least one polymer of the abovementioned type. The use of these compositions for the finishing treatment of metal surfaces, and especially the finishing treatment of aluminum surfaces, constitutes a more specific aspect of the invention.

A polymer according to the present invention bears two types of functionalities which make it particularly suitable for treating metal surfaces intended to be painted, namely:

- phosphonic acid/phosphonate functions borne by the units u1, which anchor the polymer onto the metal surface, in a particularly efficient manner especially on aluminum surfaces;
- amine functions borne by the units u2 (and optionally the alcohol functions borne by the units u3), which are capable of reacting with the molecules conventionally used in paints, namely, in particular:
  isocyanate functions —NCO
  epoxide functions The sole presence of the phosphonate units u1 and of the amine units u2 suffices to ensure the twofold effect (i) of anchoring onto the metal surface and (ii) of attaching the paint subsequently deposited. That being said, especially for cost reasons, it may be advantageous to replace some of the amine functions with alcohol functions.

Thus, according to an advantageous embodiment, a polymer P according to the invention comprises units u3 in addition to the units u2. Where appropriate, it is preferred for the amine/alcohol mole ratio, corresponding to the total amount of amine functions present on the polymer relative to the total amount of alcohol functions present on the polymer, to be between 1:4 and 4:1, this amine/alcohol mole ratio typically being between 1:2 and 2:1. Moreover, it is preferable for the primary amine/alcohol mole ratio, corresponding to the total amount of primary amine functions present on the polymer relative to the total amount of alcohol functions present on the polymer, to be between 1:4 and 4:1, this primary amine/alcohol mole ratio preferably being between 1:2 and 2:1.

According to a particular embodiment, a polymer according to the invention may comprise, as all or some of its units u2, mixed units, bearing both amine functions (optionally partly or totally protonated) and alcohol functions. Mixed units u2 of this type include, for example, chitosan, or partially hydrolyzed chitin. In this case in point, all or some of the units u3 are combined with these units u2 bearing both amine functions (optionally totally or partly protonated) and alcohol functions.

According to a particular variant of the invention, the polymers of the abovementioned type may comprise, in addition to the abovementioned phosphonate and amine/alcohol functions, hydrophobic groups, typically in the form of side chains, typically linear or branched C8 to C22 alkyl or alkenyl groups. The polymers according to the invention which contain such hydrophobic groups are especially useful for modifying metal surfaces (especially aluminum surfaces) and for giving them an anti-wear effect. These hydrophobic groups may be readily incorporated into the polymers according to the invention either during their synthesis (as is illustrated below in the present description) or, alternatively, during post-modification: it is very easy, for example, to graft a hydrophobic group, noted hereinbelow as —RH, using as the point of attachment some of the amine groups (and/or all or some of the OH groups, where appropriate):

- it is possible, for example, to react some of the amine groups borne by a polymer according to the invention with a carboxylic acid RH—COOH (via which the group RH is linked to the polymer via an amide function), or, more advantageously, with an alkyl halide RH—X, in which X is a halogen, especially Cl (via which the group RH is linked to the polymer via a particularly stable amine function N—RH),
- alternatively or in addition, some of the alcohol groups borne by a polymer according to the invention may be reacted with a carboxylic acid RH—COOH (via which the group RH is linked to the polymer via an ester function), or, more advantageously, by converting the alcohol group into an ether function —O—RH, which is more stable.

According to another aspect, a subject of the present invention is various routes for accessing the polyfunctional polymer of the invention:

A first process for preparing a polymer according to the invention comprises:

a step (E1) of radical polymerization of a mixture comprising:
ethylenically unsaturated monomers m1 (precursors of the phosphonate units u1 of the polymer) bearing phosphonic acid functions —P(=O)(OH)$_2$ in their acid form or totally or partly in deprotonated form, typically vinylphosphonic acid monomers (VPA) of formula CH$_2$=CH—P(O)(OH)$_2$ and/or vinyldiphosphonic acid monomers (VDPA) of formula CH$_2$=C(—PO$_3$H$_2$)$_2$, preferably vinylphosphonic acid monomers (VPA);
ethylenically unsaturated monomers m2 (precursors of the amine units u2 of the polymer) bearing protected amine functions, typically N-vinylformamide or N-vinylacetamide monomers;
optionally, ethylenically unsaturated monomers m3 (precursors of the alcohol units u3 of the polymer) bearing protected alcohol functions, typically vinyl acetate monomers;
via which a polymer P1 bearing phosphonate, protected amine (and optionally protected alcohol) functions is obtained;
and then
a step (E2) of deprotection (typically by hydrolysis) of at least some of the protected amine functions, and, where appropriate, the protected alcohol functions, of the polymer P1 obtained in step (E1).

Step (E1) is typically a reaction in which all of the monomers m1, m2 and, where appropriate, m3 are placed in contact with a source of free radicals, via which, on conclusion of step (E1), a polymer P1 of statistical type is obtained (optionally with concentration gradients within the polymer as a function of the reactivities of the monomers present).

Alternatively, the polymerization of the monomers m1, m2 and m3 may be performed sequentially during step (E1), in which case the polymer P1 may be a block copolymer. Thus, according to an advantageous variant, step (E1) may comprise, for example, separately: (i) the radical polymerization of the monomers m1 with only some of the monomers m2 and m3, leading to the formation of a block rich in phosphonate units; and (ii) the radical polymerization of a mixture comprising the rest of the monomers m2 and m3, leading to the formation of a block free of phosphonate units.

The particular polymers of the type obtained in steps (E1) and (E2) form another particular subject of the present invention.

Step (E1) typically uses monomers m2 (and where appropriate m3) bearing amine functions (and where appropriate alcohol functions) in protected form, typically in the form of an amide for the amine functions; and in the form of an ester for the alcohol functions. This protection generally proves to be necessary insofar as the unsaturated monomers bearing amine and alcohol functions are generally unstable.

In step (E2), deprotection of the functions is performed, typically by acidic or basic hydrolysis of at least some of the amide and/or ester functions.

During the deprotection of the protected functions in step (E2), it is possible to modify some of the amine or alcohol functions to graft onto the polymer hydrophobic chains RH of the abovementioned type, especially linear or branched C8 to C22 alkyl or alkenyl groups. This may especially be performed via a transesterification reaction.

Preferably, at least some (and preferably all) of the phosphonic acid, protected amine and protected alcohol groups borne by the monomers m1, m2 and m3 of step (E1) are alpha to the ethylenically unsaturated bond, via which the phosphonic acid, amine and alcohol functions in the final polymer are particularly well stabilized on the polymer backbone.

It should be noted that, according to a particular alternative, it is not excluded to use monomers m2 and/or m3 bearing unprotected amine and/or alcohol functions, if the corresponding monomer is stable, but such cases are rare.

Another process for preparing a polymer according to the invention comprises a step (E) of grafting monomers m bearing phosphonic acid functions (in their acid form or totally or partly in deprotonated form) onto a base polymer (also referred to hereinbelow as "prepolymer P$_0$") comprising units u2 (and optionally units u3) of the abovementioned type.

According to this embodiment, the prepolymer P$_0$ advantageously bears primary amine groups —NH2 and/or secondary amine groups (optionally protonated), and it is advantageous for it to comprise primary amine groups (typically, all the amine functions borne by the prepolymer P$_0$ are primary amines —NH2 (optionally totally or partly protonated).

To perform the post-grafting of step (E), the monomers m used in this step bear both the abovementioned phosphonic acid functions (optionally totally or partly deprotonated) (the monomers m are as such the precursors of the phosphonate units u1 of the polymer finally obtained), and functions that are capable of reacting with at least some of the amine functions (and optionally of the alcohol functions in certain cases) borne by the prepolymer P$_0$ to form a covalent bond between said prepolymer and the monomer m, which leads to functionalization of the prepolymer P$_0$ with phosphonic acid functions (which are optionally totally or partly deprotonated).

The implementation of step (E) leads to particular polymers, bearing side groups bearing phosphonic acid groups (in acid form or totally or partly in deprotonated form) derived from the grafting of the monomers m onto the prepolymer backbone. These particular polymers of the type obtained in the grafting step (E) form yet another particular subject of the present invention.

According to a first possible variant of step (E), the monomers m used bear aldehyde, epoxy or halogen (especially —Cl or —Br) functions, which are capable of forming covalent bonds by reacting with the amine functions borne by the prepolymer P$_0$.

According to an advantageous variant, the post-grafting of step (E) is performed by reacting the prepolymer P$_0$ with monomers m which are monomers m1 of the abovementioned type, i.e. monomers bearing phosphonic acid functions (which are optionally totally or partly deprotonated) that are specifically ethylenically unsaturated. In this case, it is the ethylenically unsaturated functions that make it possible, by reaction with the amines, to form a covalent bond.

Typically, as ethylenically unsaturated monomer m for step (E), use may be made of vinylphosphonic acid (VPA) or, even more advantageously, vinyldiphosphonic acid (VDPA) of formula CH$_2$=C(—PO$_3$H$_2$)$_2$.

In particular, when one of these two acids is used, especially VDPA, as monomer m for performing the grafting of step (E), the reaction between the prepolymer P$_0$ and the monomers m is advantageously performed at a pH of less than 8, more preferentially less than 7.

Surprisingly, it has now been demonstrated that the amine groups (especially the primary amines) present on the prepolymer P$_0$ react with the double bonds of the abovementioned monomers m1 (in particular VDPA) via a mechanism of Michael addition type, and do so most particularly efficiently when these compounds are in acidic medium. This addition in acidic medium is entirely unexpected, insofar as it is well known that a Michael addition is, specifically, rather favored under basic conditions.

When step (E) is performed, it is possible, in parallel with the grafting of the phosphonate functions onto the prepolymer $P_0$, to graft other functions onto the prepolymer, by using monomers similar to the monomers m but bearing other functions. For example, hydrophobic groups RH of the abovementioned type, especially linear or branched C8 to C22 alkyl or alkenyl groups, may be grafted onto the prepolymer $P_0$.

Irrespective of the nature of the monomers m used in step (E), the prepolymer $P_0$ may typically be, in a nonlimiting manner:

a commercial polymer comprising amine units u2 (and optionally alcohol units u3) of the abovementioned type, for instance the Lupamine polymers sold by BASF, or alternatively the vinyl alcohol-vinyl amine polymers available from the company Erkol, or alternatively the polyethyleneimines (PEI) and ethoxylated PEIs sold by BASF under the name Lupasol;

or a natural polymer comprising amine units u2 (and optionally alcohol units u3) of the abovementioned type, for instance chitosan or partially hydrolyzed chitin;

or a polymer prepared according to a process comprising:
  a step ($E_{01}$) of radical polymerization of ethylenically unsaturated monomers m2 bearing protected amine functions (typically N-vinylformamide or N-vinylacetamide monomers) and optionally ethylenically unsaturated monomers m3 bearing protected alcohol functions (typically vinyl acetate monomers), leading to a polymer $P_{01}$ bearing protected amine functions (and optionally protected alcohol functions); and then
  a step ($E_{02}$) of deprotection (typically by hydrolysis) of at least some of the protected amine functions, and, where appropriate, of the protected alcohol functions, of the polymer $P_{01}$ obtained in step ($E_{01}$).

Various particular advantages and embodiments of the invention will now be described in greater detail.

The Polyfunctional Polymer According to the Invention

Irrespective of its mode of preparation, the polymer according to the invention is a polymer comprising phosphonate units (u1), amine units (u2) and alcohol units (u3), and consisting typically of phosphonate units (u1), amine units (u2) and alcohol units (u3).

Preferably, in a polymer according to the invention, the content of phosphonate units, corresponding to the ratio of the total amount of phosphonic acid functions (in acid form or totally or partly in deprotonated form) to the total amount of phosphonic acid functions (in acid form or totally or partly in deprotonated form), amine functions (optionally totally or partly protonated) and alcohol functions is between 1 and 50 mol %, typically between 2 and 40 mol %, for example between 3 and 20 mol %.

Consequently, in a polymer according to the invention, the total content of amine and alcohol units, corresponding to the ratio of the total amount of amine functions (optionally totally or partly protonated) and alcohol functions to the total amount of phosphonic acid functions (in acid form or totally or partly in deprotonated form), amine functions (optionally totally or partly protonated) and alcohol functions is preferably between 50 and 99 mol %, typically between 70 and 95 mol %.

In a polymer according to the invention, the content of amine units, corresponding to the ratio of the total amount of amine functions (optionally totally or partly protonated) to the total amount of phosphonic acid functions (in acid form or totally or partly in deprotonated form), amine functions (optionally totally or partly protonated) and alcohol functions is preferably between 5 and 50 mol %, typically between 10 and 40 mol %.

In a polymer according to the invention, when alcohol units are present, the content of alcohol units, corresponding to the ratio of the total amount of alcohol functions relative to the total amount of phosphonic acid functions (in acid form or totally or partly in deprotonated form), amine functions (optionally totally or partly protonated) and alcohol functions is preferably between 40 and 95 mol %, typically between 50 and 90 mol %.

Typically, a polymer according to the invention has a content of phosphonate units of from 5 to 15 mol %; a content of amine units of from 10 to 30 mol %; and a content of amine units of from 55 to 85 mol %.

Moreover, a polymer according to the invention typically has a weight-average molecular mass (Mw) of less than 1 000 000 g/mol, preferably less than 500 000 g/mol or even less than 250 000 g/mol, for example between 10 000 and 100 000 g/mol. The weight-average molecular mass to which reference is made here may typically be measured by GPC.

A polymer according to the invention typically has a relatively linear structure, in particular when it is synthesized according to the abovementioned steps (E1) and (E2). However, it is not excluded for it to have a branched structure. According to yet another particular embodiment, it may also have a crosslinked structure.

Similarly, the prepolymer $P_0$ used in step (E) is often a linear polymer, via which the polymer obtained by grafting of the monomers m onto this polymer has, itself also, a relatively linear structure, of "short-toothed comb" type, with phosphonate side groups along a linear chain comprising amine units. However, in this case also, it is not excluded to start with a branched, or even crosslinked, prepolymer $P_0$, via which a branched or crosslinked polymer is obtained.

Preparation of a Polyfunctional Polymer According to Steps (E1) and (E2)

The radical polymerization step performed in step (E1) may be performed according to any means known per se.

Typically, but in a nonlimiting manner, step (E1) may be performed by gradually adding the monomers m2 to a feedstock containing the monomers m1 (and, where appropriate, m3).

Initiation of the radical polymerization may take place according to any means known per se that is compatible with the monomers used.

According to a particular embodiment, step (E1) may be a controlled radical polymerization, performed in the presence of a radical polymerization control agent.

For the purposes of the present description, the term "radical polymerization control agent" means a compound which is capable of extending the lifetime of the growing polymer chains in a polymerization reaction and of conferring, on the polymerization, a living and controlled nature. This control agent is typically a reversible transfer agent as used in controlled radical polymerization denoted by the terminology RAFT or MADIX, which typically use a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2794464 or WO 02/26836.

According to an advantageous embodiment, the radical polymerization control agent used is a compound which comprises a thiocarbonylthio group —S(C═S)—. Thus, for example, it may be a compound which comprises a xanthate group (bearing —SC═S—O— functions), for example a xanthate. Other types of control agent may be envisaged (for example of the type used in CRP or in ATRP).

According to a particular embodiment, the control agent used may be a polymer chain derived from a controlled radical polymerization and bearing a group that is capable of controlling a radical polymerization (polymer chain of "living" type, which is a type that is well known per se). Thus, for example, the control agent may be a polymer chain (preferably hydrophilic or water-dispersible) functionalized at the chain end with a xanthate group or more generally comprising an —SC═S— group, for example obtained according to the MADIX technology.

Thus, a radical polymerization control agent that is advantageous according to the invention may, for example, correspond to formula (A) below:

(A)

in which:
Z represents:
  a hydrogen atom,
  a chlorine atom,
  an optionally substituted alkyl or optionally substituted aryl radical,
  an optionally substituted heterocycle,
  an optionally substituted alkylthio radical,
  an optionally substituted arylthio radical,
  an optionally substituted alkoxy radical,
  an optionally substituted aryloxy radical,
  an optionally substituted amino radical,
  an optionally substituted hydrazine radical,
  an optionally substituted alkoxycarbonyl radical,
  an optionally substituted aryloxycarbonyl radical,
  an optionally substituted acyloxy or carboxyl radical,
  an optionally substituted aroyloxy radical,
  an optionally substituted carbamoyl radical,
  a cyano radical,
  a dialkyl- or diarylphosphonato radical,
  a dialkyl-phosphinato or diaryl-phosphinato radical, or
  a polymer chain,
and
$R_1$ represents:
  an optionally substituted alkyl, acyl, aryl, aralkyl, alkene or alkyne group,
  a saturated or unsaturated, aromatic, optionally substituted carbocycle or heterocycle, or
  a polymer chain, which is preferably hydrophilic or water-dispersible when the agent is used in step (E).

The groups $R_1$ or Z, when they are substituted, may be substituted with optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl, S-aryl, groups of hydrophilic or ionic nature such as alkali metal salts of carboxylic acids, alkali metal salts of sulfonic acid, polyalkylene oxide chains (PEO, PPO), cationic substituents (quaternary ammonium salts), R representing an alkyl or aryl group, or a polymer chain.

The optionally substituted alkyl, acyl, aryl, aralkyl or alkyne groups generally contain from 1 to 20 carbon atoms, preferably from 1 to 12 and more preferentially from 1 to 9 carbon atoms. They may be linear or branched. They may also be substituted with oxygen atoms, in particular in the form of esters, sulfur atoms or nitrogen atoms.

Among the alkyl radicals, mention may be made especially of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they bear at least one acetylenic unsaturation, such as the acetylenyl radical.

The acyl group is a radical generally containing from 1 to 20 carbon atoms with a carbonyl group.

Among the aryl radicals, mention may be made especially of the phenyl radical, which is optionally substituted, in particular with a nitro or hydroxyl function.

Among the aralkyl radicals, mention may be made especially of the benzyl or phenethyl radical, which is optionally substituted, in particular with a nitro or hydroxyl function.

When $R_1$ or Z is a polymer chain, this polymer chain may result from a radical or ionic polymerization or from a polycondensation.

Advantageously, compounds bearing a xanthate —S(C═S)O—, trithiocarbonate, dithiocarbamate or dithiocarbazate function, for example bearing an O-ethyl xanthate function of formula —S(C═S)OCH$_2$CH$_3$, are used as control agent.

The use of a polymerization control agent of the abovementioned type is most particularly advantageous when it is desired to produce blocks of different nature in step (E1).

Irrespective of the nature of step (E1), the monomers m1 used therein, which are precursors of the phosphonate units u1 of the polymer may be chosen from vinylphosphonic acid monomers, in particular vinylphosphonic acid (VPA) of formula CH2═CH—P(O)(OH)$_2$ and/or vinyldiphosphonic acid (VDPA) of formula CH$_2$═C(—PO$_3$H$_2$)$_2$.

The monomers m2 used in step (E1), which are precursors of the amine units u2 of the polymer, may themselves be chosen from monomers of vinylamide type, such as N-vinylformamide or N-vinylacetamide.

The monomers m3 used in step (E1), which are precursors of the alcohol units u3 of the polymer, may especially be chosen from vinyl esters, such as vinyl acetate.

The step of deprotection of the protected amine functions, and, where appropriate, of the protected alcohol functions, of step (E2) may itself be performed by acidic or basic hydrolysis, under conditions that are well known per se.

Preparation of a Polyfunctional Polymer According to Steps (E)

The grafting in step (E) is generally performed very simply, by placing the monomers m and the prepolymer $P_0$ in contact.

The prepolymer $P_0$ may, if need be, be synthesized according to a radical polymerization process which may use a radical polymerization control agent of the type described above for step (E1), which makes it possible, should it be necessary, to obtain prepolymers of controlled size and/or architecture (for example blocks).

According to an advantageous embodiment, the monomers m are monomers m1 of the abovementioned type, for example vinylphosphonic acid (VPA) and/or vinyldiphosphonic acid (VDPA). Advantageously, the monomers m comprise (or even consist of) vinyldiphosphonic acid monomers (VDPA) having the formula $CH_2=C(-PO_3H_2)_2$.

Examples of Use of a Polyfunctional Polymer According to the Invention

A polymer according to the invention may, among other applications, be used for the finishing treatment of metal surfaces intended to be painted or varnished ("metal finishing"), in particular for the surface treatment of aluminum. In this context, the polymer is typically used within an aqueous base formulation.

The polymer of the invention may more generally be used for cleaning metal surfaces.

When they bear hydrophobic groups, or are post-grafted with such hydrophobic groups, the polymers according to the invention may be used to give a metal surface, especially an aluminum surface, an anti-wear effect. Schematically, the polymers according to the invention are immobilized on the metal surface where they maintain the hydrophobic groups, which are thus in a position to provide a protective effect on the metal surface when it is subjected to friction.

The invention claimed is:

1. A polyfunctional polymer comprising:
    monomer units u1 bearing phosphonic acid functions $-P(=O)(OH)_2$ in acid form or, totally or partly, in deprotonated form;
    monomer units u2 bearing amine functions, wherein the amine functions of the monomer units u2 comprise primary amines $-NH_2$ that are optionally totally or partly protonated in ammonium form $NH_3^+$;
    optionally, monomer units u3 bearing alcohol functions $-OH$.

2. The polyfunctional polymer as claimed in claim 1, which comprises monomer units u3 bearing alcohol functions $-OH$, with an amine/alcohol mole ratio corresponding to the total amount of amine functions present in the polymer relative to the total amount of alcohol functions present in the polymer between 1:4 and 4:1.

3. The polyfunctional polymer as claimed in claim 1, which also comprises hydrophobic groups.

4. A process for preparing a polyfunctional polymer as claimed in claim 1, the process comprising:
    a step (E1) of radical polymerization of a mixture comprising:
        ethylenically unsaturated monomers m1 bearing phosphonic acid functions $-P(=O)(OH)_2$ in their acid form or totally or partly in deprotonated form;
        ethylenically unsaturated monomers m2 bearing protected amine functions;
        optionally, ethylenically unsaturated monomers m3 bearing protected alcohol functions;
        via which a polymer P1 bearing phosphonate, protected amine and optionally protected alcohol functions is obtained;
    and then
    a step (E2) of deprotection of at least some of the protected amine functions, and, where appropriate, the protected alcohol functions, of the polymer P1 obtained in step (E1).

5. A process for preparing a polyfunctional polymer as claimed in claim 1, the process comprising a step (E) of grafting monomers m bearing phosphonic acid functions, in their acidic form and/or totally or partly in deprotonated form, onto a base polymer comprising monomer units u2 bearing amine functions, which are optionally totally or partly protonated, and, optionally, monomer units u3 bearing alcohol functions $-OH$.

6. The preparation process as claimed in claim 5, in which the monomers m are:
    monomers bearing aldehyde, epoxy or halogen functions, which are capable of forming covalent bonds by reacting with the amine functions borne by the base polymer;
    or
    monomers bearing phosphonic acid functions, which are also ethylenically unsaturated.

7. The preparation process as claimed in claim 6, in which the monomers m are vinylphosphonic acid or vinyldiphosphonic acid monomers, and in which the reaction between the monomers m and the base polymer in step (E) is performed at a pH of less than 8.

8. A method for the finishing treatment of metal surfaces intended to be painted or varnished, or for the cleaning of metal surfaces, the method comprising using the polymer as claimed in claim 1.

9. The method of claim 8, wherein the metal surface is given an anti-wear effect.

10. The polyfunctional polymer as claimed in claim 3, wherein the hydrophobic groups are linear or branched C8 to C22 alkyl or alkenyl groups.

11. The process of claim 4, wherein the ethylenically unsaturated monomers m1 are vinylphosphonic acid monomers $CH2=CH-P(O)(OH)_2$ and/or vinyldiphosphonic acid monomers $CH_2=C(-PO_3H_2)_2$.

12. The process of claim 4, wherein the ethylenically unsaturated monomers m2 are N-vinylformamide or N-vinylacetamide monomers.

13. The process of claim 4, wherein the ethylenically unsaturated monomers m3 are-vinyl acetate monomers.

14. The process of claim 4, wherein the step (E2) of deprotection is hydrolysis.

15. The preparation process as claimed in claim 6, wherein the halogen functions are $-Cl$ or $-Br$.

16. The preparation process as claimed in claim 6, wherein the monomers bearing phosphonic acid functions are vinylphosphonic acid or vinyldiphosphonic acid monomers.

17. The preparation process as claimed in claim 7, wherein the reaction between the monomers m and the base polymer in step (E) is performed at a pH of less than 7.

18. The method of claim 8, wherein the metal surfaces are aluminum surfaces.

* * * * *